United States Patent
Karppanen

(10) Patent No.: US 9,582,312 B1
(45) Date of Patent: Feb. 28, 2017

(54) EXECUTION CONTEXT TRACE FOR ASYNCHRONOUS TASKS

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 14/613,621

(22) Filed: Feb. 4, 2015

(51) Int. Cl.
  *G06F 9/46* (2006.01)
  *G06F 11/30* (2006.01)
  *G06F 11/34* (2006.01)

(52) U.S. Cl.
  CPC .......... *G06F 9/461* (2013.01); *G06F 11/3017* (2013.01); *G06F 11/3466* (2013.01)

(58) Field of Classification Search
  CPC .. G06F 9/461; G06F 11/3017; G06F 11/3466; G06F 11/3632; G06F 11/3636
  USPC .................. 717/108, 128, 130, 131; 718/108
  See application file for complete search history.

(56) References Cited

U.S. PATENT DOCUMENTS

| | | | |
|---|---|---|---|
| 5,758,184 A | 5/1998 | Lucovsky et al. | |
| 6,289,446 B1 * | 9/2001 | Nilsson | G06F 9/4425 712/242 |
| 6,480,818 B1 | 11/2002 | Alverson et al. | |
| 6,560,773 B1 * | 5/2003 | Alexander, III | G06F 11/3466 707/999.202 |
| 6,625,635 B1 | 9/2003 | Elnozahy | |
| 6,779,180 B1 * | 8/2004 | Palm | G06F 9/4425 712/E9.082 |

(Continued)

FOREIGN PATENT DOCUMENTS

| | | |
|---|---|---|
| EP | 0 330 836 B1 | 3/1995 |
| EP | 0 544 822 B1 | 5/1999 |

OTHER PUBLICATIONS

Ravindranath et al., "AppInsight: Mobile App Performance Monitoring in the Wild," Microsoft Research, Presented at the 10th USENIX Symposium on Operating Systems Design and Implementation, OSDI 2012.*

(Continued)

*Primary Examiner* — Wei Zhen
*Assistant Examiner* — Andrew M Lyons
(74) *Attorney, Agent, or Firm* — Knobbe, Martens, Olson & Bear, LLP

(57) ABSTRACT

Context information associated with asynchronous tasks executing in a multithread computer processing environment can be captured. An identifier block having context information associated with tasks executed in the thread is stored in a call stack of a thread. For asynchronous tasks that execute in the thread, a context trace component causes the thread to place an identifier block in the stack of the thread. The identifier block stores context information associated with the currently executing task and with one or more previously executed tasks. Context information currently stored in an identifier block can be retrieved and stored in subsequent identifier blocks, thereby enabling capture of a sequential context trace of asynchronous tasks that execute in the thread. The context trace information stored in the identifier block can be retrieved to support failure analysis when a task fails to execute properly.

12 Claims, 11 Drawing Sheets

EXECUTION OF ASYNCHRONOUS TASK (TASK A) WITHIN AN EXECUTION THREAD

(56) References Cited

U.S. PATENT DOCUMENTS

| | | | | |
|---|---|---|---|---|
| 6,857,120 | B1* | 2/2005 | Arnold | G06F 9/4425 712/E9.082 |
| 7,020,871 | B2 | 3/2006 | Bernstein et al. | |
| 7,401,112 | B1* | 7/2008 | Matz | G06F 9/5038 379/265.02 |
| 7,631,304 | B2* | 12/2009 | Bearman | G06F 8/433 717/144 |
| 7,685,607 | B2 | 3/2010 | Frank et al. | |
| 7,930,687 | B2* | 4/2011 | Moorthy | G06F 9/4425 717/106 |
| 8,196,109 | B2 | 6/2012 | Fung et al. | |
| 8,392,930 | B2* | 3/2013 | Goldin | G06F 11/3612 715/738 |
| 8,458,723 | B1* | 6/2013 | Delany | G06F 9/461 712/228 |
| 8,468,526 | B2 | 6/2013 | Saha et al. | |
| 8,522,222 | B2* | 8/2013 | Tillmann | G06F 8/443 717/128 |
| 8,595,702 | B2 | 11/2013 | Maybee et al. | |
| 8,838,939 | B2 | 9/2014 | Elnozahy et al. | |
| 8,843,684 | B2* | 9/2014 | Jones | G06F 13/24 710/260 |
| 2002/0174162 | A1* | 11/2002 | Perks | G06F 9/466 718/101 |
| 2004/0148594 | A1* | 7/2004 | Williams | G06F 9/4425 717/158 |
| 2005/0028145 | A1* | 2/2005 | Kang | G06F 11/3636 717/128 |
| 2005/0039186 | A1* | 2/2005 | Borkan | G06F 11/3476 719/310 |
| 2006/0054946 | A1* | 3/2006 | Baek | H01L 27/14685 257/292 |
| 2006/0085601 | A1* | 4/2006 | Woffinden | G06F 12/0875 711/133 |
| 2007/0143323 | A1* | 6/2007 | Vanrenen | G06F 9/5038 |
| 2008/0127117 | A1 | 5/2008 | Panchamukhi et al. | |
| 2008/0276261 | A1* | 11/2008 | Munshi | G06F 9/4843 719/328 |
| 2009/0019439 | A1 | 1/2009 | Kwon et al. | |
| 2009/0307663 | A1 | 12/2009 | Maybee et al. | |
| 2010/0235815 | A1* | 9/2010 | Maybee | G06F 11/3664 717/125 |
| 2010/0275190 | A1 | 10/2010 | Ishizaki | |
| 2011/0055484 | A1* | 3/2011 | Eichenberger | G06F 9/3814 711/125 |
| 2011/0087864 | A1* | 4/2011 | Duluk, Jr. | G06F 9/30087 712/220 |
| 2011/0107307 | A1* | 5/2011 | Liu | G06F 11/3664 717/125 |
| 2011/0179399 | A1 | 7/2011 | Bekiroglu et al. | |
| 2011/0252216 | A1 | 10/2011 | Ylonen et al. | |
| 2011/0258421 | A1 | 10/2011 | Elnozahy et al. | |
| 2011/0258608 | A1* | 10/2011 | Li | G06F 11/3644 717/127 |
| 2011/0276983 | A1* | 11/2011 | Syme | G06F 9/461 719/314 |
| 2012/0210332 | A1* | 8/2012 | Zhao | G06F 9/4843 718/107 |
| 2012/0278659 | A1* | 11/2012 | Han | G06F 11/302 714/38.1 |
| 2012/0311540 | A1* | 12/2012 | Fanning | G06F 11/3612 717/127 |
| 2013/0036331 | A1 | 2/2013 | Zhang et al. | |
| 2013/0074088 | A1* | 3/2013 | Purcell | G06F 9/4881 718/103 |
| 2013/0117751 | A1* | 5/2013 | Duluk, Jr. | G06F 9/4881 718/102 |
| 2013/0185728 | A1* | 7/2013 | Abdalla | G06F 9/4881 718/103 |
| 2014/0136691 | A1* | 5/2014 | Crosby | G06F 11/3476 709/224 |
| 2014/0189711 | A1* | 7/2014 | Luiz | G06F 9/4812 718/106 |
| 2014/0237452 | A1* | 8/2014 | Wischik | G06F 11/3632 717/125 |
| 2014/0282427 | A1* | 9/2014 | Fanning | G06F 11/366 717/128 |
| 2014/0380282 | A1* | 12/2014 | Ravindranath Sivalingam | G06F 11/3476 717/128 |
| 2015/0100963 | A1* | 4/2015 | Govindarajeswaran | G06F 9/4881 718/102 |

OTHER PUBLICATIONS

Sambasivan et al., "So, you want to trace your distributed system? Key design insights from years of practical experience," Carnegie Mellon University Parallel Data Laboratory, Apr. 2014.*

Arnold et al., "Stack Trace Analysis for Large Scale Debugging," Parallel and Distributed Processing Symposium, 2007, IEEE 2007, last retrieved from http://ieeexplore.ieee.org/stamp/stamp.jsp?arnumber=4227982 on Dec. 10, 2016.*

Stasyuk, Andrew, "Async Programming—Async Causality Chain Tracking," Microsoft Magazine Blog, Feb. 2013, last retrieved from https://msdn.microsoft.com/en-us/magazine/jj891052.aspx on Dec. 10, 2016.*

Redstone, Joshua A. et al., "An Analysis of Operating System Behavior on a Simultaneous Multithreaded Architecture," *Proceedings of the 9th International Conference on Architectural Support for Programming Languages and Operating Systems, University of Washington*, Nov. 2000, 12 pp.

Silberschatz, A. et al., "Operating System Concepts Essentials," John Wiley & Sons Inc., 2011, pp. 145-166.

* cited by examiner

SYNCHRONOUS EXECUTION OF TASKS WITHIN AN EXECUTION THREAD

EXECUTION OF ASYNCHRONOUS TASK (TASK A) WITHIN AN EXECUTION THREAD

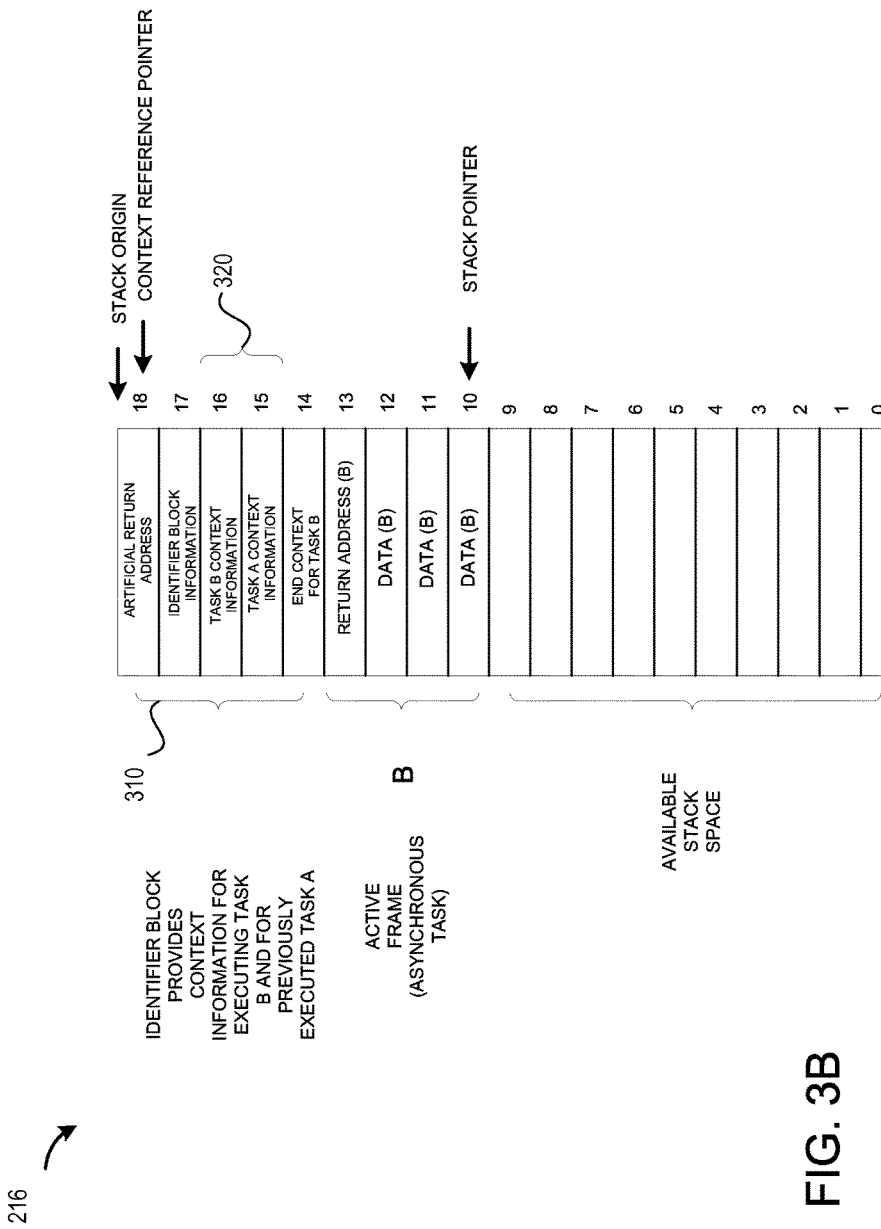

EXECUTION OF A THIRD ASYNCHRONOUS TASK (TASK C) WITHIN AN EXECUTION THREAD

TWO ASYNCHRONOUS TASKS (D & F) WITH A NORMAL FUNCTION CALL (E) BETWEEN THEM

F (fault address XXX)
E
D
Thread Identifier::ExecuteTask
Thread Identifier::MessageLoop
main()

FIG. 3E

CALL STACK BACK TRACE CORRESPONDING TO AN EXECUTION FAILURE OF ASYNCHRONOUS TASK F, EXECUTING IN AN ENVIRONMENT THAT LACKS THE DISCLOSED EXECUTION CONTEXT TRACE INFORMATION

EXECUTION CONTEXT TRACE FOR ASYNCHRONOUS TASKS

BACKGROUND

Generally described, software applications include executable code to implement various processes associated with the software application. It is common for applications to implement single processes as multiple sub-processes, often referred to as threads of control. For example, a web browser might have one thread display images or text while another thread retrieves data from the network. In another example, a word processor may have a thread for displaying graphics, another thread for responding to user keystrokes, and a third thread for performing spelling and grammar checking in the background.

In certain situations, a single application may be required to perform several similar tasks, for example, a web server accepts client requests for web pages, images, sound, and so forth. A busy web server may have several (perhaps thousands of) clients concurrently accessing it. If the web server were to run as a traditional single-thread process, it would be able to service only one client at a time, and clients might have to wait unacceptably long times for their requests to be serviced. It is generally more efficient to use one process that contains multiple threads. Illustratively, in a multithreaded web server process, the server can create a separate thread to listen for client requests. When a client request is detected, the server can create a new thread to service the client request, and the first thread can resume listening for additional client requests.

There are several advantages to using multithread programming. Multithreading an interactive application may allow a program to continue running even if part of it is blocked or is performing a lengthy operation, thereby increasing responsiveness to the user. For example, a multithreaded web browser could allow user interaction in one thread while an image is being loaded in another thread. Threads share the memory and resources of the process to which they belong. The benefit of sharing code and data is that it allows an application to have several different threads of activity executing within the same address space. Allocating memory and resources for process creation can be costly. Since threads share the resources of the process to which they belong, it is more efficient to create and context-shift threads than it is to create new processes.

Processes that execute in a multithreaded execution environment are also susceptible to experiencing concurrency errors that can occur when multiple threads of a process execute independently (as opposed to sequentially) as asynchronous tasks. For example, a multithread process can execute portions of the process in a first thread in a sequence relative to the execution of a portion of the process in a second thread, where the first thread sets a variable to a value that causes the second thread to crash. Debuggers can provide useful information relating to the crashed second thread, such as the position in the program at which it crashed. But the first thread, whose action caused or contributed to the crash of the second thread, continues to execute, and the state of the first thread at the time of the second thread's crash is typically not available for capture. The lack of visibility into the first thread's execution state around the time that the second thread crashed makes it difficult to determine the cause of the second thread's crash. For debugging purposes, it is desirable to determine the source of the asynchronous task that crashed; however, the thread that originated the crashed asynchronous task may have terminated already, or it may have returned from the function that created the asynchronous task that crashed, thereby making it difficult to determine the cause of the crash. Moreover, crashes resulting from the interaction of a greater number of threads executing portions of a single process concurrently can present a greater challenge to identify the root cause of the crash.

BRIEF DESCRIPTION OF THE DRAWINGS

The accompanying drawings and the associated descriptions are provided to illustrate embodiments of the present disclosure and do not limit the scope of the claims. Like reference numerals throughout the drawings designate corresponding similar parts.

FIG. 3B is a functional block diagram illustrating a call stack of a thread execution component, in accordance with an embodiment of the present disclosure, in which the thread execution component is processing a second task and in which an identifier block provides context information associated with the initial and second tasks.

FIG. 3E is an example of a call stack back trace corresponding to an execution failure of an asynchronous task executing in an environment that lacks execution context information in accordance with an embodiment of the present disclosure.

DETAILED DESCRIPTION

Figure 1:
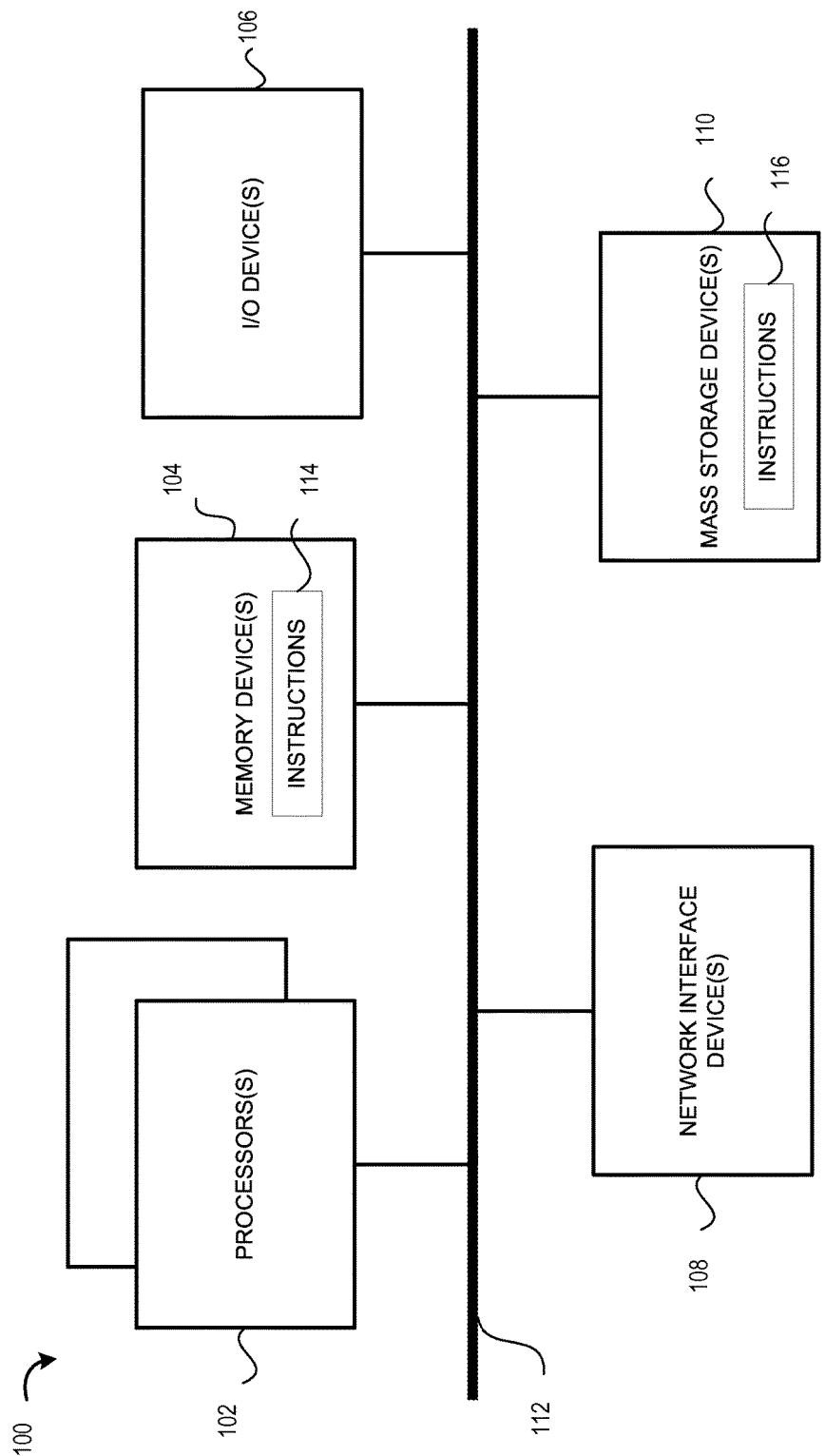
FIG. 1 is a functional block diagram of an example general purpose computer system suitable for use in executing the disclosed methods and computer-readable media for managing a multithreaded process execution environment.

Disclosed herein are systems, methods and non-transitory, computer-readable media for capturing context information associated with asynchronous tasks executed by a thread of a multithread process execution environment. In particular, information identifying the source of an asynchronous task—where that source executes in a different thread—is captured and stored in the call stack of the thread in which the asynchronous task executes. Being able to use pre-computed unique identifiers of process functions, and a context information structure that can be simply copied (excluding the most recent new record) and embedded into the call stack of the thread that executes the asynchronous task allows for asymptotically amortized, constant time tracing of originating function calls.

Multithreaded programs present challenges to programmers and testers when they try to debug problems that arise during execution. Programs that execute sequentially (i.e., synchronously') are relatively easy to debug since the sequence of execution is known and is always followed. Thus, when an execution error occurs in a synchronous processing environment, the call stack of the synchronous processing environment will identify the function that called the task that failed during execution. Moreover, the call stack can have information associated with one or more tasks that executed prior to the failed task, because they can be related, such as, for example, in a nested execution process. The information associated with the previously executed tasks can provide additional context information for debugging purposes.

In contrast, programs configured to execute in a multi-threaded processing environment do not execute in a deterministic, sequential manner. Instead, tasks execute in a sequence that is determined by many system-specific characteristics at the time of execution, such as, for example, the availability of computing resources, the number of other processes concurrently executing in the multithreaded processing environment, and the time it takes to execute any particular task. Thus, it is possible, and often likely, that many of the tasks that execute in a thread of a multithreaded processing environment are not related to each other, i.e., the tasks are asynchronous. In such a multithreaded processing environment there are multiple call stacks (one for each execution thread), and so when an asynchronous task is created for another thread to execute, the originating thread continues to execute other things, and the call stack that possesses context information related to the asynchronous task (executing in a different thread) can (and will likely) be lost. Moreover, because many of the tasks are asynchronous, it is possible that information associated with previously executed tasks will be removed from the thread's call stack because the executing task does not rely or depend on the previously executed tasks.

The present application relates to systems, methods and non-transitory, computer-readable media for capturing context information associated with asynchronous tasks being executed by a thread in a multithread process execution environment. In particular, aspects of the present disclosure relate to storing, in the call stack of the thread, an identifier block having context information associated with asynchronous tasks executed in the thread. The stored context information identifies the source of the asynchronous task, which necessarily (because the task is asynchronous) comes from a different thread having a different call stack. For each asynchronous task that executes in a thread, a context trace component causes the thread to place an identifier block in the stack of that thread. The identifier block stores context information associated with the currently-executing asynchronous task. In particular, the stored context information comes from a different thread (and call stack) than the thread in which the asynchronous task is currently executing. In an embodiment, a new identifier block can retrieve context information stored in a previous identifier block, thereby creating a sequential context trace of asynchronous tasks that execute in a particular thread. The context information stored in the identifier block can be retrieved to support failure analysis when a task fails to execute properly. Older context information, whose value diminishes as subsequent tasks execute successfully in the thread, can be deleted to maintain a storage size limit of the identifier block.

An example embodiment provides a method for managing a computer processing environment. Unique identifiers are generated for each function of a process, where each function of the process can create one or more tasks to be executed by a thread. Illustratively, the unique identifiers can be generated during compilation of the program code of the process. A reference data structure is also generated that correlates the unique identifiers with their associated functions. The process begins executing in the computer processing environment. An asynchronous task to be executed in another thread is identified, and a task object, associated with the identified task, is created. The task object is a data construct configured to store context information associated with the identified task, such as the unique identifier associated with the function that created the identified task. The unique identifier can be retrieved from the reference data structure, or alternatively, the compiler can embed the unique identifier during compile time. The task object is also configured to store context information associated with the currently executing asynchronous task, and with previously executed tasks related to the asynchronous task, which executed in one or more different threads. This context information can be retrieved from an identifier block, stored in the stack of the thread, which is associated with the currently executing task. Once the task object has stored the retrieved context information associated with the identified asynchronous task, the currently executing and previously executed tasks from different threads, the identified task is placed in a task queue of another thread. When the thread is ready to execute the identified asynchronous task, execution information associated with the identified asynchronous task is loaded into the call stack of the thread. Additionally an identifier block, containing the context information stored in the task object, is loaded into the call stack of the thread. Illustratively, the identifier block may be viewed as an artificial function call placed in the call stack. The identifier block takes the form of function call instructions stored in the call stack, but it serves to capture context information associated with the currently executing asynchronous task to support failure analysis in the event that the currently executing asynchronous task fails to execute properly. Accordingly, the identifier block has an artificial return address that is configured to cause the thread to advance to a preceding function call (i.e., skip past the identifier block) when the currently executing asynchronous task completes its execution, thereby passing over the identifier block in the call stack. The identified task is then executed in the thread, and a next task to be executed by the thread is identified. In some embodiments, the method includes a capability to identify when the identifier block in the call stack of the thread has reached a maximum capacity. When the maximum capacity is reached, context information can be deleted from the identifier block on a first-in, first-out basis.

Illustratively, when an asynchronous task fails to execute properly, the context information stored in the identifier block of the call stack can be retrieved. The reference data associated with the generated identifiers can be accessed to correlate the retrieved context information with the functions of the process corresponding to the tasks in the context information, thereby providing an historical back trace of context information to support failure analysis and debugging efforts. In an embodiment, a specific naming practice can be used for the artificial functions, having identifier information embedded therein. Such a naming practice can allow industry standard debugging tools to generate a back trace with extra context information contained therein. A debugging library that that understands the context blocks will output portions of the originating thread's back traces in addition to the normal, per-thread back trace.

An example embodiment provides a system for capturing a context trace in a thread. A computing system includes at least one processor, an operating system, and a memory device, and is configured to execute a process in a multi-thread process execution environment. A thread, having a call stack, is configured to execute a plurality of tasks of the process in the multithread process execution environment. A context trace component is configured to identify when an asynchronous task is assigned to a thread. The context trace component is also configured to create an identifier block having context information associated with the identified asynchronous task. The context information includes information about the originator of the asynchronous task, which executes in a different thread. Accordingly, the identifier block, stored in the call stack of the thread in which the asynchronous task executes, contains context information from—a different thread—about the source of the asynchronous task. The context information associated with an asynchronous task stored in the identifier block can include a unique identifier, such as a numeric code, that identifies the function that created the task. The context information can also include values of local variables or values of parameters used by the task during execution. The identifier block can include information that describes a characteristic of the identifier block, such as a description of the storage space required to store the identifier block in the call stack. In an embodiment, a characteristic includes a content length of the identifier block which is the first element of the context information stored in the identifier block, allowing for blind copying of the context information without having to understand or parse the content of the context information.

Various aspects of the disclosure will now be described with regard to certain examples and embodiments, which are intended to illustrate, but not to limit the disclosure. Nothing in this disclosure is intended to imply that any particular feature or characteristic of the disclosed embodiments is essential. The scope of protection is defined in the claims.

FIG. 1 is a functional block diagram of an embodiment of a general purpose computing system suitable for use in implementing the disclosed systems and executing the disclosed methods and non-transitory, computer-readable storage media for managing a multithreaded computer processing environment, in accordance with an embodiment of the present disclosure. By way of illustration, the computing system includes a computing device 100. The computing device 100 can take one or more of different forms, including, by way of non-limiting examples, a laptop computer, a stand-alone personal computer, a server, a tablet, a workstation, a handheld device, a mobile device (such as a smartphone), and a consumer electronic device (such as a video game console), to name a few. The computing device 100 can be a stand-alone device, or it can be configured to be part of a computing network, a computing cluster, a cloud-based computing infrastructure, or the like.

In a basic configuration, the computing device 100 can include one or more processors 102 and one or more memory devices 104. The one or more processors 102 can be configured to execute instructions and to process data to perform one or more functions, such as the methods and computer-readable media disclosed herein. Illustratively, the one or more processors 102 may include, without limitation, two or more processing cores on a single processing chip, two or more separate processor chips, or both. In some embodiments, the computing device 100 can also include one or more additional or specialized processors (not shown), such as, for example, a graphics processor to perform graphics processing functions that can be diverted from the one or more processors 102 to relieve their workload. The memory 104 can be arranged in a hierarchy and can include one or more levels of cache. The memory 104 may include one or more memory devices that store data, including without limitation, volatile memory such as random access memory (RAM), non-volatile memory, such as and read-only memory (ROM), flash memory, etc., or a combination of volatile and non-volatile memory.

The computing device 100 can also include one or more input and output (I/O) connections, such as USB connections, display ports, proprietary connections, and others to connect to various devices to provide inputs and outputs to the computing device 100. The I/O device(s) 106 may include one or more components that allow a user of the computing device 100 to interface with applications executing in the computing device 100. For example, the I/O device 106 may include devices such as a keyboard, a mouse, a touch pad, a touch screen, a microphone, an accelerometer, a camera, or any other user input device configurable to work with the computing device 100. The I/O device(s) 106 may also include, for example, a display (e.g., an LCD display, a CRT display, an electronic ink display, or a plasma display), a printer, a speaker, or any other output devices configurable to work with the computing device 100.

The computing device 100 can also include one or more network interface devices 108 that allow the computing device 100 to communicate with other computers and applications. The one or more network interface devices 108 may include any communication device for sending and receiving data across a network, including but not limited to, a network interface card, a modem, or another network adapter capable of transmitting and receiving data over a network. Communication protocol connections can include, without limitation, an Ethernet interface, a wireless interface, a bus interface, a storage area network interface, and a proprietary interface. Communication connections established via the network interface devices 108 can be used to connect the computing device 100 to a computer network. A computer network is a telecommunications network that enables computers, and possibly other devices, to exchange data and share resources along data connections. There are many different types of computing networks that exhibit a variety of characteristics such as topology, connection method, and scale. Examples of computer networks include a local area network, a wide area network, the Internet, or other networks.

The computing device 100 can also include one or more mass storage devices 110. The one or more mass storage devices 110 can be removable or non-removable, and can include, without limitation, a magnetic storage device (e.g., a hard disk), an optical storage medium (e.g., a compact disc (CD) drive or a digital versatile disc (DVD) drive), a high-definition optical storage medium, an electronic storage device (e.g., an erasable programmable read-only memory (EPROM) or a flash drive), solid-state memory, flash storage devices, or other data storage devices known in the art. Computer storage media can include volatile, non-volatile, removable, and non-removable media configured to store information such as, for example, computer-readable instructions, data arrangements, program components, or other information. Illustratively, computer storage media can include, without limitation, random access memory (RAM), read-only memory (ROM), electrically erasable programmable read-only memory (EEPROM), flash memory, solid-state memory, CD-ROM, DVD memory, or other optical storage, magnetic cassettes, magnetic tape, magnetic disk storage or other magnetic storage devices, a universal serial bus (USB) flash drive, a flash memory card, or other flash storage devices, or any other storage medium that may be configured to store computer-readable information and that can be read by the computing device 100. The one or more memory devices 104 and one or more the mass storage devices 110 may be employed to store a working copy and a permanent copy of programming instructions, illustrated as instructions 114 and 116, respectively, for implementing various aspects of the embodiments of the present disclosure. The components of the computing device 100 can be coupled together by way of a bus 112, which may represent one or more buses.

The computing device 100 may be configured to operate under the control of an operating system, and the computing device 100 may also be configured to execute one or more application programs. An application program is executed by the computing device 100 as a process. The process may include methods, routines, procedures, subroutines, function calls or the like. Thus a process and its corresponding methods, routines, procedures, subroutines, function calls, and the like comprise a program that is being executed. A process that is executing on the computing device 100 allocates computing resources to support execution of the process. One or more thread execution components, also referred to herein simply as "threads or a thread," operate in the context of executing the process. A thread can be defined as a basic unit of processor utilization, and it is the component that executes tasks of a process that can be scheduled for execution. In a multithreading computing environment, more than one thread operates on the process to execute multiple tasks concurrently to improve efficiency of computing resource utilization, thereby decreasing overall execution time of the process.

Tasks are logical units of work to be executed, and threads are a mechanism by which tasks can execute asynchronously. Concurrent applications are typically organized around the execution of tasks: abstract, discrete units of work. Dividing the work of an application's executing main process (or function, routine, process, method, subroutine, etc.) into tasks can simplify program organization, facilitate error recovery by providing logical transaction boundaries, and promote concurrent processing by providing an approach for executing work in parallel.

Tasks are ideally independent activities: work that doesn't depend on the state, result, or side effects of other tasks. Independence supports concurrency, as independent tasks can be executed in parallel if there are adequate processing resources. For greater flexibility in scheduling and load balancing of tasks, each task may, but need not, represent a portion of an application's processing capacity. From within a task, normal function calls can be made, resulting in further additions to the call stack of the thread.

Figure 2A:
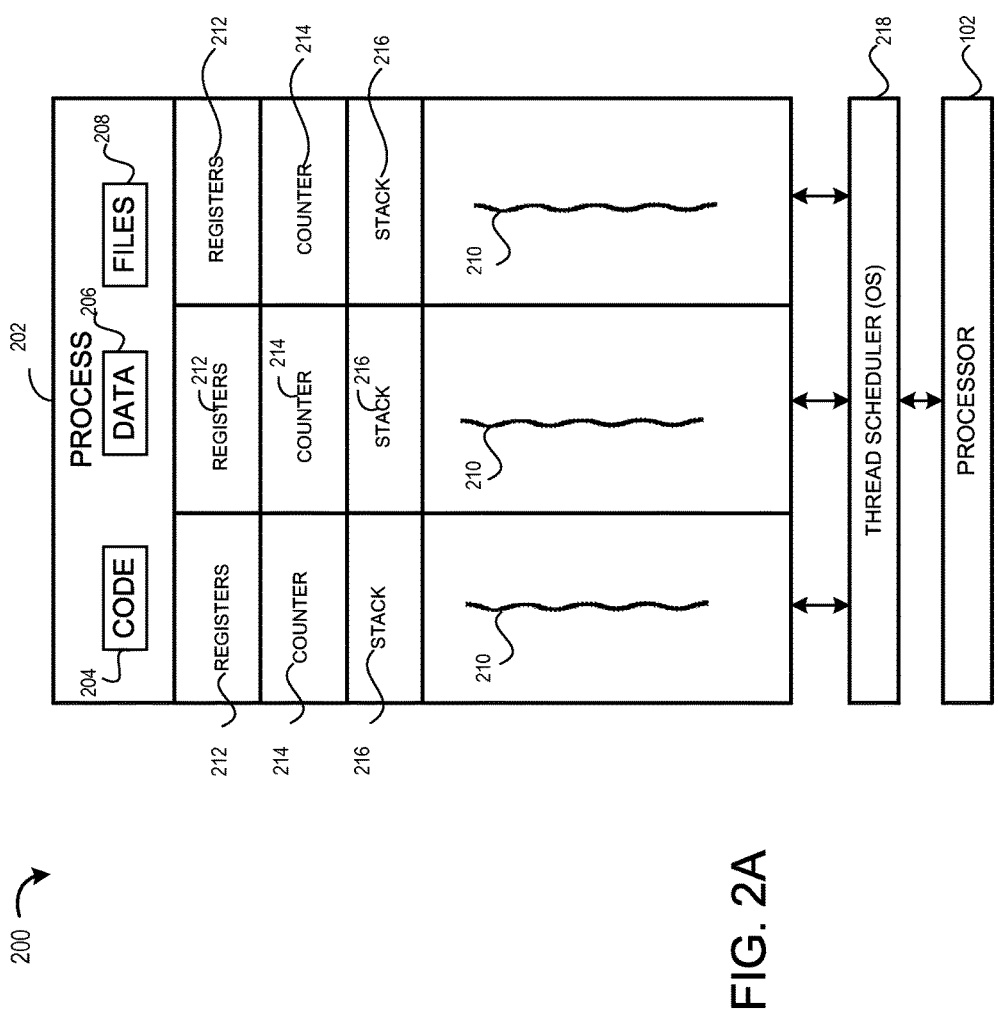
FIG. 2A is a functional block diagram illustrating an example embodiment of a multithreaded process execution environment.

FIG. 2A is a simplified functional block diagram illustrating an example embodiment of a multithread process execution environment 200. A process 202 shares with the threads belonging to the process 202, among other things, its code section 204, its data section 206 and its file section 208. By sharing such process-related resources, and in particular the memory allocated for the process 202, each thread avoids having to separately allocate computing resources in order to execute tasks associated with the process 202. Accordingly, the threads are able to access the same data of the process 202. Illustratively, three thread execution components 210 (which may also be referred to as "threads" 210) are depicted in FIG. 2A, although any number of threads 210 may be allocated to a multithread process execution environment 200 depending on, among other things, processor 102 capabilities, other processes executing in the computing device 100 concurrently, and the specific demands of the process 202 being executed. Associated with threads 210 are, among other things, registers 212, counters 214, and stacks 216, which are used by their respective threads 210 to execute tasks of the process 202. A thread scheduler 218, which is typically controlled by the operating system, manages the scheduling and assignment of tasks to the threads 210. The processor(s) 102 represents the entity in which task execution occurs, according to an embodiment of the present disclosure. Illustratively, the threads 210 can execute on two or more processing cores on a single processor chip, two or more separate processor chips, two or more processing cores on each of two or more separate processor chips, multiple logical nodes within a single processor core, or other forms of parallel or concurrent processing that are attached to a memory 104 that is shared between processor(s) 102.

A stack 216, which may also be referred to as a call stack, an execution stack, a control stack, a run-time stack, or a machine stack, is a data structure that stores information about, among other things, the active tasks of an executing process. As described above, tasks are logical units of work, created by a function (which may also referred to as a method, a routine, a procedure, a process, or a subroutine) of the executing process 202. Tasks are logical units of work that can be scheduled to "run," or execute in a thread 210. A stack 216 can be used to keep track of the point to which each active task should return control when it finishes executing. An active task is one that has been called but has not yet completed execution. Once the task has completed execution, control will be handed back to the point of call, typically the function that created the task. Activations of tasks may be nested to any level, which is a common practice in computer programming. The data structure of the stack 216 is particularly well-suited to support nested execution of tasks. The caller of the task or subroutine "pushes" onto the stack 216 the return address to which control will be returned upon completion of execution of the task. When the called task completes execution, it transfers control back to the return address and "pops" the return address off the stack 216. Similarly, the next called task pushes another return address onto the stack 216 when it is called. In such a manner a sequence of task execution continues in a particular thread 210. Additional information associated with the task that is pushed onto the stack 216 may also be stored in the stack 216. For example, local variables used by the task or global parameters passed from the process 202 may be stored in the stack 216 in association with the task. Thus, information in the stack 216 stacks up and un-stacks as the process 202 executes tasks in the various threads 210. The stack 216 can be an effective debugging tool because it provides visibility into the code locations and origins of executing tasks at any point in time. When software developers analyze execution failures or disruptions, they use the stack 216 to trace back to the source of the failed task and to evaluate the context of the executing process 202 at the time of execution failure.

As described above, scheduling and execution of asynchronous tasks, within a multithread process execution environment 200, can substantially reduce the utility of the stack 216 to help software developers trace the execution context of a failed task because the stack 216 can lack an adequate context with which to evaluate the task execution failure. Examples of asynchronous tasks, without limitation, can include offloading a time-consuming computation to a separate thread, assigning to another thread a task that is waiting for completion of a preceding task, and performing a task outside of the main process that is being executed in the multithread process execution environment 200. Synchronous tasks operate in an ordered sequence of execution, and if the currently executing task is taking a long time to complete, the process waits until the lengthy task is completed before executing the next task in the sequence. Multithreading allows for the introduction of asynchronous tasks. An advantage of multithreading is that it can decrease overall execution time by using computing resources more efficiently. Thus if the example discussed above with respect to synchronous task execution were instead being executed in a multithread process execution environment 200, the thread scheduler 218 could schedule and assign the waiting task to a different thread to execute while the lengthy executing task was executing in the first thread. Executing processes in a multithread process execution environment 200 is preferred in circumstances when a process calls tasks that can wait an unpredictable and relatively long time to complete execution. Examples of such tasks include, without limitation, accessing resources on a computer network.

Execution of processes employing multithreading to include asynchronous tasks can be challenging to analyze in contrast to the sequential, deterministic execution method of synchronous process execution. Software developers can struggle to trace the execution path of processes that include asynchronous tasks because the process executes, at least in part, in parallel. Moreover, because multithreaded processing uses both synchronous and asynchronous task execution modalities, depending on availability of resources in the particular computing environment in which the process is executing, analysis of state transitions can be difficult to achieve. Illustratively, in a multithread process execution environment 200, state transitions may occur synchronously or asynchronously, and since the tasks being executed share process data 206 and files 208, among other things, race conditions can occur such that the results of executed state transitions can impact later state transitions.

Analyzing software programs can be challenging when the origin of the portion of the program in which a failure has occurred cannot be identified at the time the failure event occurred. Illustratively, by way of example, a method for transferring control known as deferred callback (also referred to as an asynchronous callback) can present such a challenge. A deferred callback is a piece of executable code that is passed, as an argument, to another piece of executable code that is expected to execute the argument at a convenient time. The deferred callback permits a lower-level software layer, such as an operating system, to call a subroutine, or function, defined in a higher-level layer, such as the executing process. For example, an executing application process can supply a reference to a specific deferred callback function for the operating system to call. The operating system then calls this application-specific function in response to events, such as a mouse click or a keyboard key press. Implementation of asynchronous programming methods often employs callbacks, and a deferred (or asynchronous) callback associated with different events or threads could be susceptible to being executed with an invalid parameter that originates with a specific event or thread usage.

Numerous other circumstances related to currently practiced program implementation and process execution within a multithread process execution environment 200 can result in challenges to developers and testers in determining the context in which execution failures occur. Moreover, it can be impracticable to implement comprehensive cross-thread context tracing utility functions because the overhead associated with such an implementation could substantially diminish the computing efficiency gains that the multithread process execution environment 200 offers.

Figure 2B:
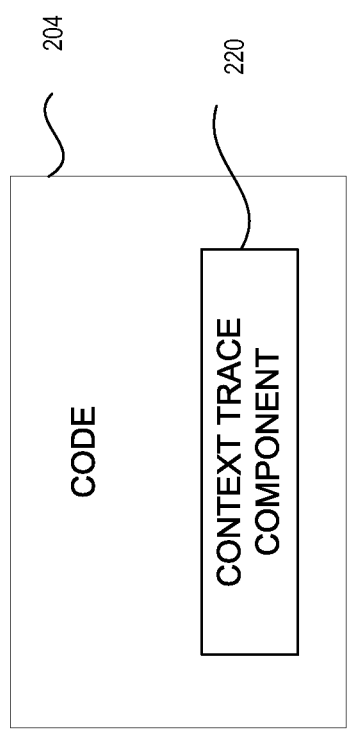
FIG. 2B is a functional block diagram illustrating a context trace component in accordance with an embodiment of the present disclosure.

FIG. 2B is a functional block diagram illustrating a context trace component 220 in accordance with an embodiment of the present disclosure. The context trace component 220 comprises a function of the executing process 202, as reflected in FIG. 2B. Illustratively, the context trace component 220 is configured to identify the entire set of functions (which may also be referred to as methods, routines, procedures, processes, subroutines, etc.) and any other portion of the program code 204 that could be called to execute in a thread 210 in the multithread process execution environment 200, referred to hereinafter as "functions." The context trace component 220 defines unique identifiers for each of the identified functions in the program code 204. In some embodiments, the same function can have multiple different identifiers where each of the multiple identifiers is used based on where or how the function is called, or based on what the compiler or runtime context trace component 220 chooses. Illustratively, by way of non-limiting example, the unique identifiers can comprise randomly generated four-bit numbers, sequential integers, or address offsets in binary executable code. One skilled in the art will readily appreciate that there are many other ways to define unique identifiers associated with the functions of the program code 204 without departing from the spirit of the present disclosure. Creation of the unique identifiers can occur when the code 204 is compiled. The context trace component 220 is also configured to create a reference data structure, in the form of a table or other suitable data format, to correlate the unique identifiers with the functions with which the identifiers are associated. In an embodiment, the reference data structure includes additional information, such as, for example, the location of the function within the code 204, dependency relationships between functions (such as nested relationships), and so forth. As described in further detail below, the context trace component 220 enables the placement of context information associated with an asynchronous task into the call stack 216 of the thread 210 that executes the asynchronous task. In some circumstances, such context information is collected from one or more threads 210 other than the thread 210 that is executing the asynchronous task, thereby providing cross-thread context information. In some circumstances, an asynchronous task executes in the same thread 210 that created it, but not as part of the original execution context. Illustratively, by way of non-limiting example, it is possible that a thread 210 that belongs to a thread pool adds an asynchronous task into its own pool's queue, and that same thread 210 later picks up the asynchronous task by random chance. In this circumstance, the original execution context information is collected from the same thread 210 in which the asynchronous task will later execute.

Figure 2C:
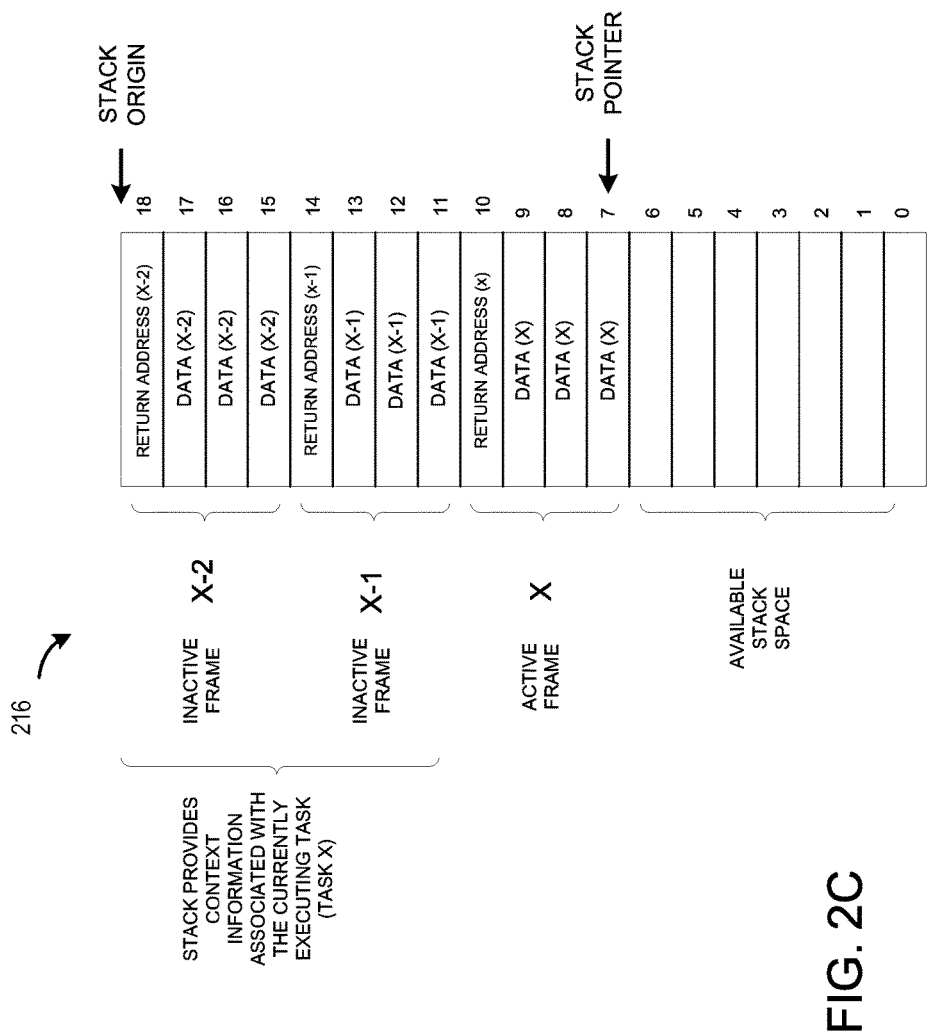
FIG. 2C is a functional block diagram illustrating a call stack of a thread execution component, in accordance with an embodiment of the present disclosure, in which the thread execution component is processing a synchronous task.

FIG. 2C is a functional block diagram illustrating the call stack 216 of the thread 210, in accordance with an embodiment of the present disclosure, in which the thread 216 is executing a synchronous (or sequential) task in the context of nested function calls. The stack 216 grows downward from its origin. Illustratively, the stack pointer points to the current, topmost element of data on the stack. A "push" operation copies data to the stack and decrements the pointer by a number of units (corresponding to the number of storage elements that get added to, or "pushed" onto the stack). A "pop" operation copies data from the stack and increments the pointer (corresponding to the number of storage elements that get moved, or "popped" off of the stack). Each function called in the executing process 202 can store a function return-of-control address (which identifies where in the executing process 202 control should next be passed) and values of local variables used by the task, and values of attributes or parameters that are passed to the task from the main process 202 by pushing them onto the stack 216. This set of data stored in the stack 216 can be referred to as a call frame. Illustrated in FIG. 2C are storage locations 0 through 18 that are stacked vertically. There are three call frames depicted in FIG. 2C, corresponding to tasks X, X-1, and X-2. Task X is an active frame, which means that task X is currently executing in thread 210. Tasks X-1 is the task that will immediately follow task X. Task X-1 is indicated as being an inactive frame. Similarly, task X-2 is the task that will immediately follow task X-1, and it too is inactive. Storage elements 0 through 6 are available stack space that is not being used in the present illustration.

Figure 3A:
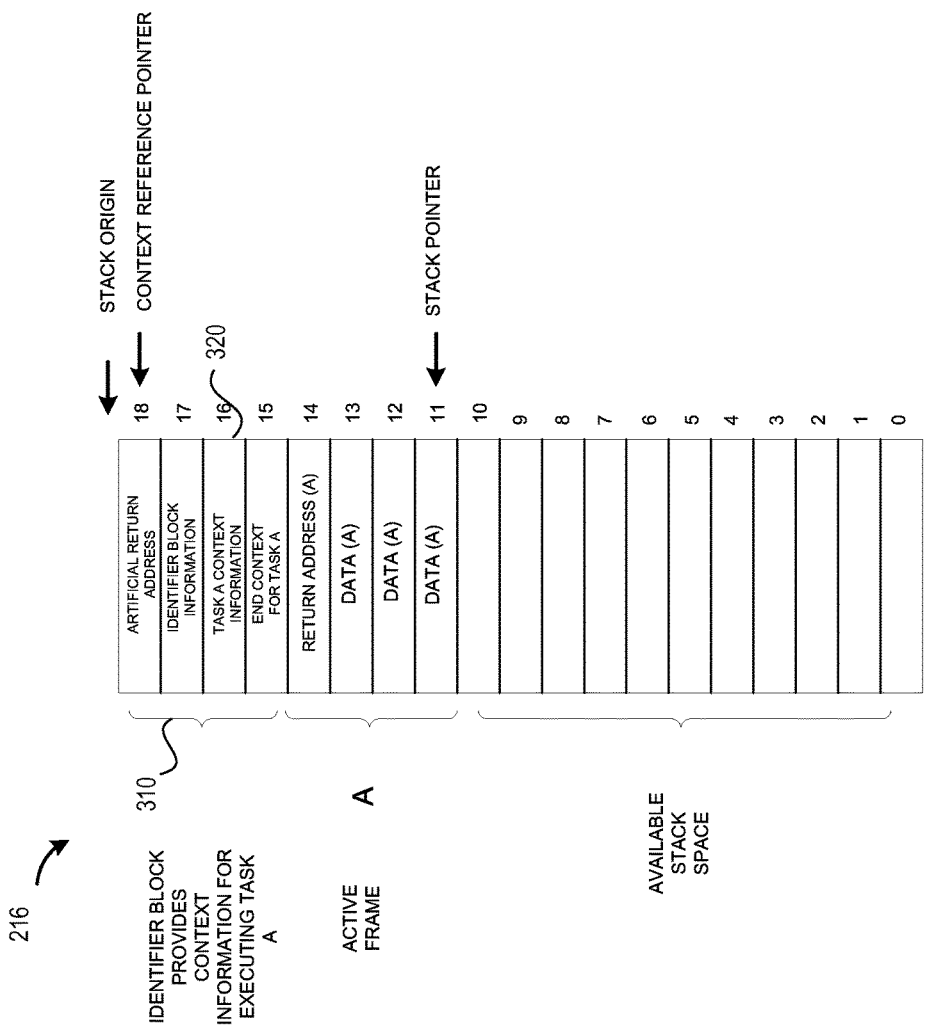
FIG. 3A is a functional block diagram illustrating a call stack of a thread execution component, in accordance with an embodiment of the present disclosure, in which the thread execution component is processing an initial task and in which an identifier block provides context information associated with the initial task.

Referring to FIG. 3A, disclosed herein are systems, methods and non-transitory, computer-readable media for capturing context information associated with asynchronous tasks executed by a thread 210 of a multithread process execution environment 200. In particular, information about the source of the asynchronous task—executing in a different thread—is captured and stored in the call stack 216 of the thread 210 in which the asynchronous task is executing. If the asynchronous task fails to execute properly, the stored context information can be used to analyze the failure. An identifier block 310 is stored in the call stack 216 of the thread 210. The identifier block 310 stores context information associated with the asynchronous task executing in the thread 210. Illustratively, the context information in the identifier block 310 includes information about the source of the asynchronous task, which executes in a different thread 210 of the multithread process execution environment 200. For each asynchronous task that executes in the thread 210, the context trace component 220 causes the thread 210 to place an identifier block 310 in the stack 216 of the thread 210. The identifier block 310 stores context information associated with the currently executing asynchronous task and information about one or more previously executed or concurrently executing tasks in other threads 210 of the multithread process execution environment 200. Illustratively, the context trace information stored in the identifier block 310 can be retrieved to support failure analysis when the asynchronous task fails to execute properly.

FIG. 3A is a functional block diagram illustrating the call stack 216 of a thread 210, in accordance with an embodiment of the present disclosure, in which the thread 210 is processing an asynchronous task, task A, in a multithreaded process execution environment 200. There is an active call frame depicted in FIG. 3A, corresponding to task A, which occupies storage locations 11 through 14. Illustratively, task A is an active frame, which means that task A is currently executing in thread 210. Storage elements 0 through 10 represent available stack space that is not being used in the present illustration. As illustrated in FIG. 3A, an identifier block 310 occupies stack storage elements 15-18. The identifier block 310 is a data construct, created and controlled by the context trace component 220, by which context information associated with the executing task (task A) can be captured, stored, and preserved in the stack 216 beyond the time during which asynchronous task A is executing in the thread 210. The identifier block 310 uses available storage space in the stack 216 to store context information associated with the tasks that execute within a thread, such as thread 210.

Although the identifier block 310 is stored in the stack 216, it does not provide the typical information stored in a stack 216. At storage element 18 of the stack 216 is an artificial return address. Because the stack 216 is used to sequence task execution instructions, the identifier block 310, which is stored in the stack 216, will be treated by the thread 210 as task execution instructions. Accordingly, the identifier block 310 contains executing instructions (for when the asynchronous task executes successfully) that cause the thread 210 to skip past the identifier block 310, to remove the identifier block 310 from the stack 216, and to advance to the next task in a task queue for the thread 210. In an embodiment, the executing instructions contained in the identifier block 310 perform two jump operations: the first jump is from the asynchronous task A to the identifier block 310, and the second jump operation removes the identifier block 310 from the stack 216 and returns control of the thread 210 to the next task in the queue. In the event that the asynchronous task A fails to execute properly, the identifier block 310 can provide context information to support failure analysis. Since the identifier block 310 takes the form of an artificial call frame, normal crash diagnosis tools (that perform back tracing of call frames) can process the call stack 216 and print the context information, including the unique identifier of the function that originated the asynchronous task A (which was retrieved by the context trace component 220 from a different thread 310).

The amount of context information that can be stored in the identifier block 310 can vary, depending on factors such as, for example, the number of tasks for which context information will be stored and the amount of context information required for each of the tasks. Accordingly, the identifier block 310 also includes identifier block information, illustrated at storage element 17, which can include, by way of non-limiting example, a description of the amount of storage space required to store the identifier block 310 in the stack 216 of the thread 210. The identifier block information can eliminate the need to parse the specific context information to be stored in the identifier block 310 to determine its size before allocating a portion of the available space in the call stack 216 for the identifier block 310. In an embodiment, a context reference pointer serves to point to the identifier block 310 corresponding to the presently executing asynchronous task. The context reference pointer is updated when a new identifier block 310 is placed into the call stack 216. When a new identifier block 310 is being created by the context trace component 220, the context reference pointer can be used to efficiently capture and carry forward, into the next identifier block 310, context information corresponding to the currently executing asynchronous task. In an embodiment, the context reference pointer can be included in the identifier block 310, and when the identifier block 310 is popped off the call stack 216 (corresponding to successful execution of the asynchronous task) the context reference pointer can be reset. In this manner the context trace component 220 can chain together context information from previously executed asynchronous tasks with context information of a currently executing asynchronous task to create a sequential context trace history of asynchronous tasks that have executed or are currently executing in a thread 210.

The task A context information 320 can include a unique identifier that corresponds to the function of the executing process 202 that created and called asynchronous task A to execute. In an embodiment, the unique identifier comprises a code that is generated by the executing process 202 when the program code 204 for the process 202 is compiled. Additional context information associated with asynchronous task A can be stored in the task A context information 320, such as, by way of non-limiting example, local variables or global attributes or parameters that are used by task A during execution. Illustratively, the context information 320 stored in the identifier block 310, as illustrated in FIG. 3A, can be accessed by the context trace component 220, stored in a data object associated with the next asynchronous task to be executed by the thread 210 (task B), and included in the identifier block 310 associated with the next executing asynchronous task (task B), as is shown in FIG. 3B. In this manner the context trace component 220 can place together context information from previously executed asynchronous tasks with context information of currently executing asynchronous tasks to create a sequential context trace history of asynchronous tasks that either have executed or are currently executing in the thread 210. An end indicator at storage element 15 signifies the endpoint of the identifier block 310. One skilled in the art will appreciate that the informational content of the identifier block 310 can organized in any order, depending, for example, on operational system requirements, without departing from the spirit of the present disclosure.

FIG. 3B is a functional block diagram illustrating the call stack 216 of the thread execution component 210, in accordance with an embodiment of the present disclosure, in which the thread 210 is processing, in a multithreaded processing environment 200, a second asynchronous task (task B) and in which an identifier block 310 provides context information associated with the previously executed, task (task A) and the currently executing, task (task B). For purposes of illustration, we assume that task A and task B are not related to, or dependent upon, each other, i.e., they are asynchronous tasks that happen to execute one after another in thread 210. Thus when task A finishes executing successfully, the context information associated with task A (at stack addresses 11-14 in FIG. 3A) will pop off the stack 216, and the identifier block 310 (at stack addresses 15-18 in FIG. 3A) will pop off the stack 216. A new identifier block 310 will be pushed onto the stack 216 (at stack addresses 14-18 in FIG. 3B), and context information associated with task B (at stack addresses 10-13 in FIG. 3B) will be pushed onto the stack 216, as illustrated in FIG. 3B. Identifier block 310 includes context information associated with previously executed task A (at storage element 15) and context information associated with currently executing task B (at storage element 16). For illustration purposes in FIG. 3B, one storage element of the stack 216 is allocated for task A context information and one storage element of the stack 216 is allocated for task B context information. However, the amount of storage space used to store context information can vary, depending on the amount of context information that is associated with any particular task. Illustratively, the set of context information 320 stored in the identifier block 310, as illustrated in FIG. 3B, can be accessed by the context trace component 220, stored in a data object associated with the next asynchronous task to be executed by the thread 210 (task C), and included in the identifier block 310 associated with the next executing task (task C), as will be shown in FIG. 3C. In the manner illustrated, the context trace component 220 builds and carries forward an historical context trace of asynchronous tasks being executed in the thread 210.

Figure 3C:
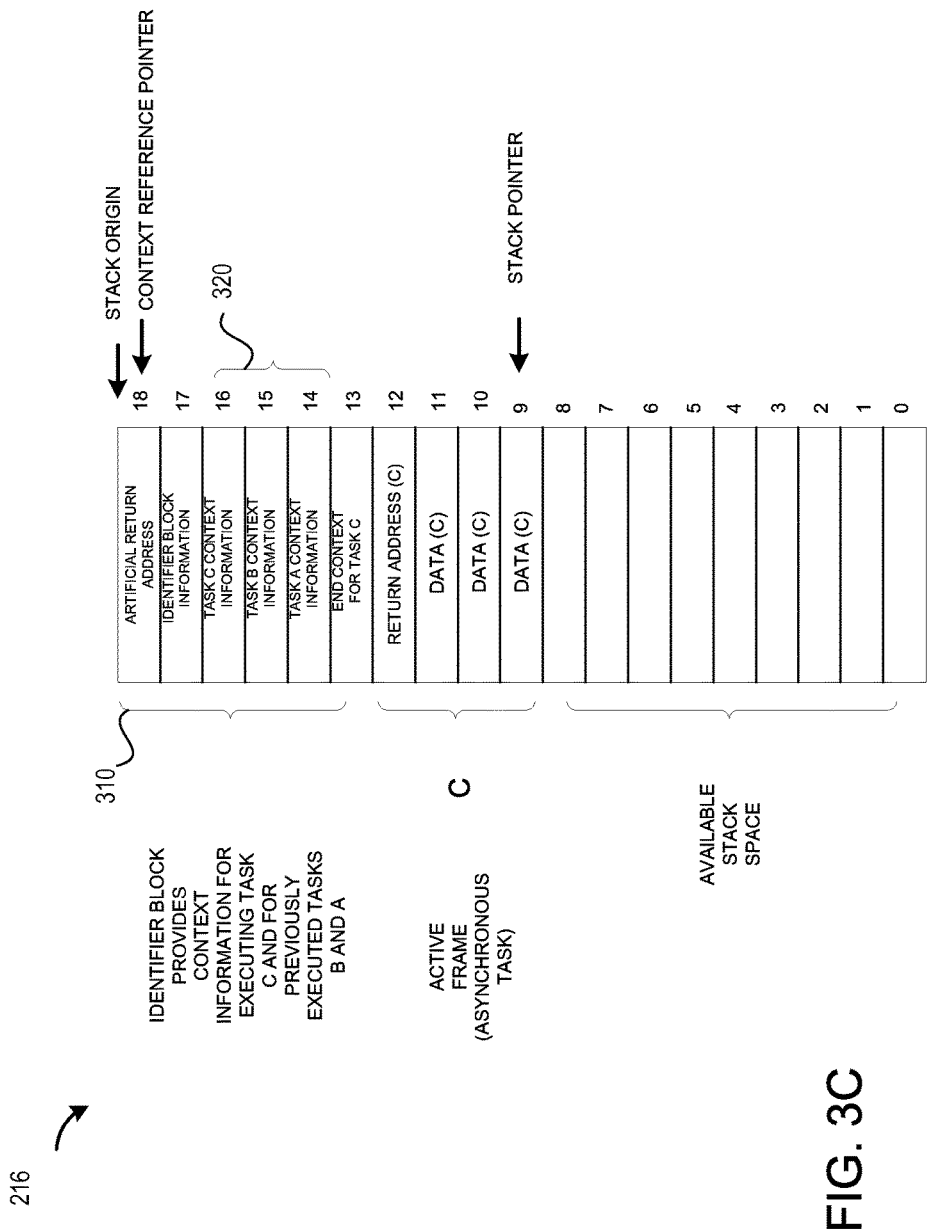
FIG. 3C is a functional block diagram illustrating a call stack of a thread execution component, in accordance with an embodiment of the present disclosure, in which the thread execution component is processing a third task and in which an identifier block provides context information associated with the initial, second and third tasks.

FIG. 3C is a functional block diagram illustrating the call stack 216 of the thread execution component 210, in accordance with an embodiment of the present disclosure, in which the thread execution component 210 is processing, in a multithreaded process execution environment 200, a third asynchronous task (task C) and in which an identifier block 310 provides context information associated with the previously executed initial task (task A), the previously executed second task (task B), and the currently executing task (task C). For purposes of illustration, we assume that task B and task C are not related to, or dependent upon, each other, i.e., they are asynchronous tasks that happen to execute one after another in thread 210. Thus when task B finishes executing successfully, the context information associated with task B (at stack addresses 10-13 in FIG. 3B) will pop off the stack 216, and the identifier block 310 (at stack addresses 14-18 in FIG. 3B) will pop off the stack 216. A new identifier block 310 will be pushed onto the stack 216 (at stack addresses 13-18 in FIG. 3C), and context information associated with task C (at stack addresses 9-12 in FIG. 3C) will be pushed onto the stack 216, as illustrated in FIG. 3C. Identifier block 310 includes context information associated with previously executed task A (at storage element 14), with previously executed task B (at storage element 15) and with currently executing task C (at storage element 116). Illustratively, the set of context information 320 stored in the identifier block 310 can be accessed by the context trace component 220, stored in a data object associated with the next asynchronous task to be executed by the thread 210, and included in an identifier block 310 associated with the next executing asynchronous. Thus the context trace component 220 can build and carry forward an historical context trace of the asynchronous tasks being executed in the thread 210, preserving the context information in the stack 216.

Figure 3D:
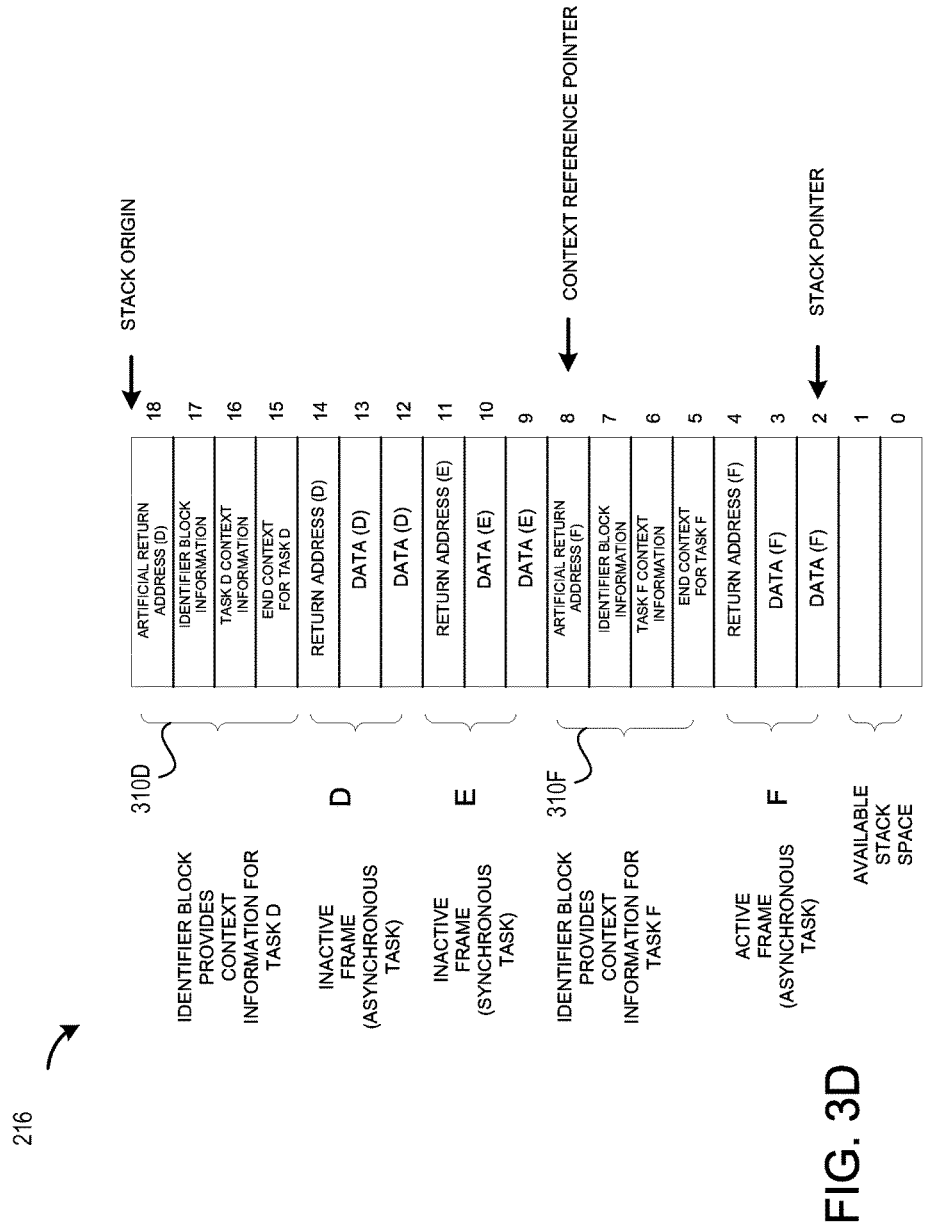
FIG. 3D is a functional block diagram illustrating a call stack of a thread execution component, in accordance with an embodiment of the present disclosure, in which multiple tasks are pushed onto the call stack.

FIG. 3D is a functional block diagram illustrating a call stack 216 of a thread execution component 210 in which multiple tasks are pushed onto the call stack 216, in accordance with an embodiment of the present disclosure. The illustrative example depicted in FIG. 3D corresponds to a circumstance in which two asynchronous (tasks D and F) have been pushed onto the stack 216. Between the two asynchronous tasks is a normal function call, task E. This represents a case where execution of asynchronous task D led to picking up and executing another task E, which in turn, led to picking up and executing another (asynchronous) task, task F. As discussed above, such nested execution scenarios are common. Identifier block 310F includes context information associated with presently executing asynchronous task F. Identifier block 310D includes context information associated with currently inactive asynchronous task D. Call frames D, E and F reflect their respective task execution information.

Figure 3F:
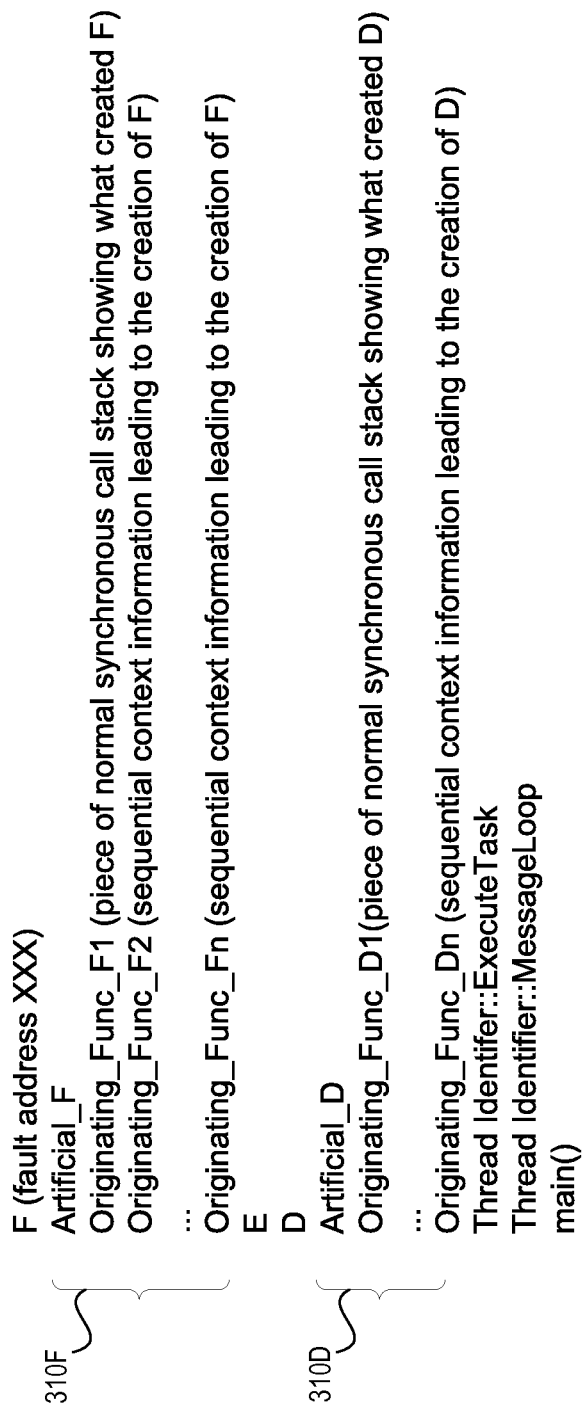
FIG. 3F is an example of a call stack back trace corresponding to an execution failure of an asynchronous task executing in an environment that includes execution context information in accordance with an embodiment of the present disclosure.

To illustrate the utility of the present disclosure, we consider the types of information available for debugging an execution failure of asynchronous task F under two scenarios: one scenario in which no execution context information is available (as reflected in FIG. 3E), and one scenario in which execution context information is available in accordance with the present disclosure (as reflected in FIG. 3F). FIG. 3E is an example of a call stack 216 back trace corresponding to an execution failure of asynchronous task F, executing in an environment that lacks execution context information. As illustrated, the back trace provides no indication of the origin of asynchronous task F. As such, analysis of the circumstances that led to the failure in execution of asynchronous task F will be very limited. In contrast, FIG. 3F is an example of a call stack 216 back trace corresponding to an execution failure of asynchronous task F, executing in an environment that includes context information in accordance with an embodiment of the present disclosure. Illustratively, the back trace in FIG. 3F provides context information captured and stored in identifier block 310F. This context information includes information associated with the function that created asynchronous task F (Originating_Func_F1) as well as predetermined number (n) of preceding normal function calls (Originating_Func_F2 through Fn) to provide a full context of the circumstances that led to execution of asynchronous task F. Accordingly, analysis of the circumstances that led to the execution failure of asynchronous task F can be performed effectively. In an embodiment, the preceding normal function calls can be collected when the identifier block 310 is created and when context information is retrieved. In an embodiment, a separate data structure is used to hold a constant size of identifier records corresponding to the functions that execute in a thread 310, creating a secondary stack with a known constant record size of m bytes. This allows for retrieving a back trace by copying n*m bytes from the secondary stack to easily retrieve a specified number of preceding function calls. Every time a function is called or returns, in addition to normal stack changes, a record is pushed or popped from the secondary stack. Illustratively, the back trace also includes context information associated with asynchronous task D since task D is present in the call stack 216 of the thread 210.

Typically, a call stack 216 is variable in storage size, within certain limits, and can expand and contract in storage allocation to accommodate the needs of executing tasks. In some embodiments the context trace component 220 can take advantage of the call stack's 216 ability to expand to steadily increase the amount of context information stored in the identifier block 310 in the stack 216 as the number of executed tasks increases. In some embodiments, a maximum storage capacity is defined for identifier block 310. Accordingly, when the maximum storage capacity is reached, the context trace component 220 deletes context information on an oldest first (i.e., first-in, first out) basis. In some embodiments, the context trace component 220 limits the amount of context information stored in the identifier block 310 to a fixed amount of storage space. The context information is stored in the identifier block 310 to help program developers and testers analyze the circumstances associated with execution failures. Accordingly, the value of stored context information diminishes as execution of subsequent tasks complete successfully without execution failures. Illustratively, by way of non-limiting example, in an embodiment of the present disclosure, the context trace component 220 provides context information for three previously executed tasks in the identifier block 310.

Figure 4:
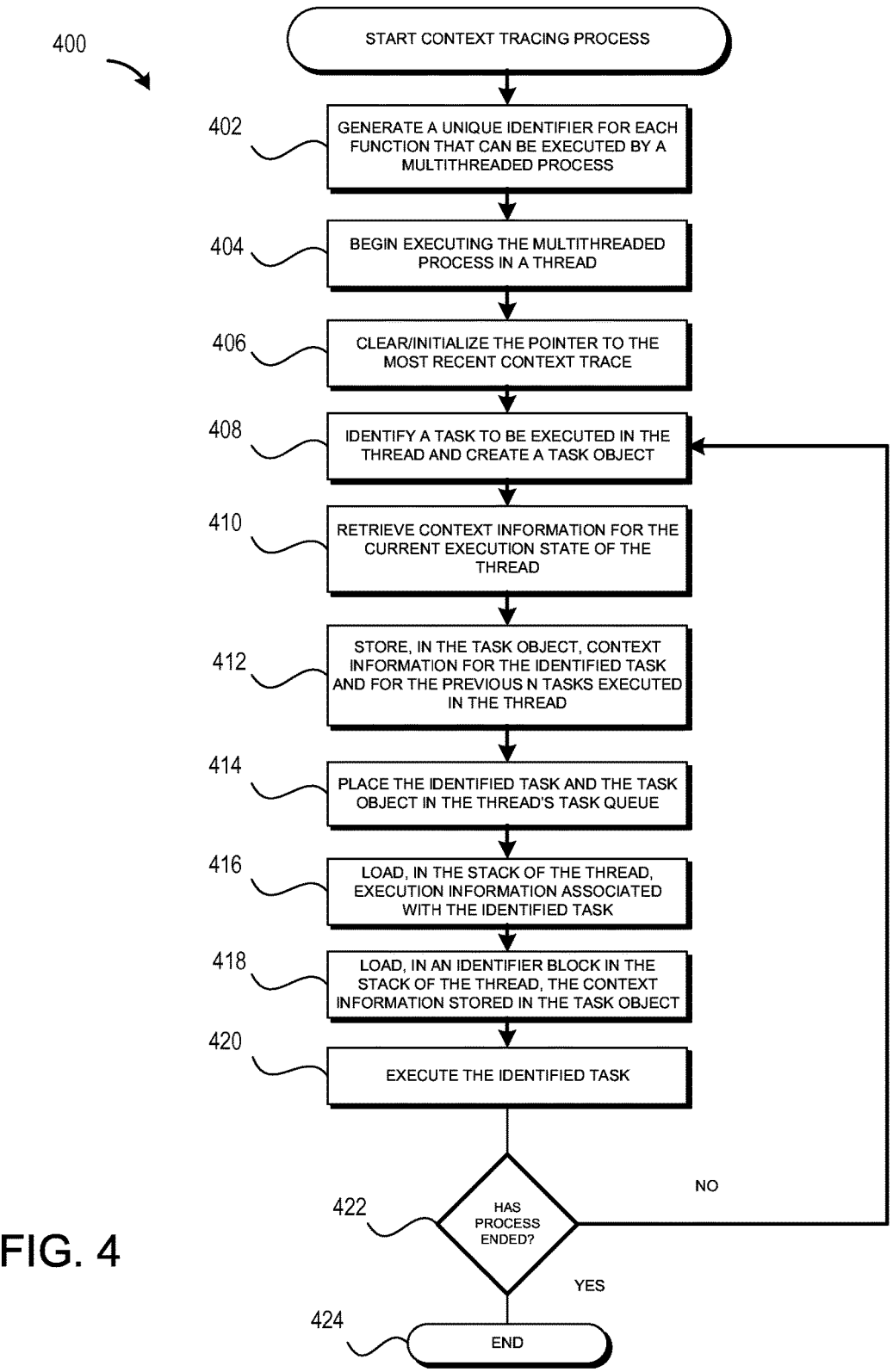
FIG. 4 is a flow diagram illustrating a multithread context tracing process in accordance with an embodiment of the present disclosure.

FIG. 4 is a flow diagram illustrating a context tracing process 400 in accordance with an embodiment of the present disclosure. At block 402, the context tracing process 400 generates a unique identifier for each function that can be executed by the process 202. In an embodiment, the unique identifiers are generated during compilation of the software program corresponding to the process 202 that will execute. In an embodiment, by way of non-limiting illustration, the unique identifier comprises a code to minimize the amount of storage space required to store context information associated with an executing task. In an embodiment, the unique identifiers comprise the memory addresses of functions of the process 202 when the binary code for all functions of the process 202 will remain in the memory of the computing device 100, and further, those memory addresses will not change as a result of, for example, dynamic loading or allocation of memory. A reference data structure can also be generated to correlate the unique identifiers with their corresponding functions of the process 202.

At block 404, the process 202 begins executing in a multithread process execution environment 200. At block 406, the threads 210 of the multithread process execution environment 200 are cleared and initialized to begin executing tasks called by functions of the process 202. At block 408, the context tracing process 400 identifies an asynchronous task to be executed. The context trace process 400 creates a task object that will store context information associated with the identified asynchronous task.

At block 410, the context trace component process 400 retrieves context information for the identified asynchronous task by identifying the function or functions that created the identified asynchronous task. The context trace component process 400 retrieves the generated unique identifier corresponding to that function or functions. The retrieved context information can include the unique identifier corresponding to the function or functions that created the identified task, and optionally, additional information associated with the identified asynchronous task to be executed. Illustratively, by way of non-limiting example, such additional information can include input variables, output variables, through variables, internal variables, global attributes or parameters, or an internal behavior description of the function. The context trace process 400 also retrieves, from the identifier block 310 in the stack 216 of the thread 210 context information associated with the currently executing task and with previously executed tasks, such as, for example, context information 320, as illustrated in FIGS. 3A-C. In an embodiment, the context trace process 400 executes a partial back trace of the call stack 216 to retrieve the context information 320.

At Block 412, the retrieved context information associated with the identified task to be executed, with the currently executing task, and with the previously executed tasks is stored in the task object to form a body of context information that will be included in an identifier block 310 associated with the identified asynchronous task to be executed. In an embodiment, the context trace process 400 also determines the amount of storage space required to store the retrieved information and stores the determined required amount of storage space with the retrieved and stored context information, to allow copying of the context information without having to parse its contents and manage storage space allocation at the time of loading into the stack 216. While call stacks 216 can be structured to accommodate varying amounts of data, the identifier block 310 of the present disclosure need not be sizeable. This is because the utility of the context information stored in the identifier block 310 of the stack 216 can be of limited duration. Typically, the context information will be accessed to help analyze the state of the thread execution component 210 when a task fails to execute properly. Thus the captured context information, as stored in the identifier block 310, could not be needed when the process 202 is executing properly. Accordingly, there may not be value in storing a lengthy historical chain of context information in the identifier block 310 associated with tasks that have previously executed successfully. In an embodiment, the context trace component 202 can manage the size of the identifier block 310. When the context trace component 202 determines that the amount of storage space required to store the retrieved information exceeds a predetermined maximum capacity, it can delete some of the stored context information, oldest information to be deleted first following a first-in, first-out methodology. In an embodiment, the maintenance of the identifier block is performed by the context trace component 202 on a regular basis, deleting old context information associated with tasks that have completed execution without a failure event. In an embodiment, the storage size of the identifier block 310 is fixed, and portions of the retrieved context information are deleted, oldest information to be deleted first following a first-in, first-out methodology, when the retrieved context information exceeds the fixed storage size of the identifier block 310.

At block 414, the identified task, along with the task object, are placed in a task queue for assignment to an available execution thread 210. Illustratively, the context information from the identifier block 310 of the currently executing task may have already moved out of the stack 216, if for example, the task completes executing. However, the task object for the identified task has stored the captured historical context information, and the context trace process 400 is configured to place the captured context information into the stack 216, in a new identifier block 310, when the identified task is called to execute in the thread 210. Thus the context trace process 400 enables the executing process 202 to preserve historical context information that would otherwise be lost.

At block 416, execution information associated with the identified task is loaded into the stack 216. In an embodiment, the loaded information can include the act of preparing the stack 216 to call a function that executes the task, for example, pushing the return address and associated data to the stack 216. At block 418, the context trace process 400 causes the thread 210 to load, in an identifier block 310 in the stack 216 of the thread 210, the context information stored in the task object associated with the identified task. In an embodiment, the context trace process 400 stores the identifier block 310 in the format of a task called by a function, including an artificial return address, to cause the stack to advance to the next task in the task queue. At block 420, the thread 210 executes the task. In the event that the task fails to execute properly, the identifier block 310 can provide context information associated with the failed task and with previously executed tasks to support failure analysis efforts. If the task executes properly, the thread 210 pops off of the stack 216 information associated with the completed task and the associated identifier block 310 and prepares to load the next task in the task queue, and where applicable, a new identifier block 310 associated with the next asynchronous task. At block 422, the context trace process determines whether the executing process 202 has ended. If not, the context trace process returns to block 408 to continue the context trace process 400 for the next task to be executed. If the main process 202 has ended, the context trace process 400 ends at block 424.

Illustratively, in a situation where execution of a task fails, and the developer needs to understand what caused the process to crash, the developer can retrieve a back trace of the call stack 216 corresponding to the thread 210 in which the task failed to execute properly. The retrieved back trace includes the current contents of the identifier block 310, which contains the context information associated with the task that failed to execute properly. The retrieved context information can contain unique identifiers that were generated by the context trace component 220, that are not readily understandable by the developer. Mapping the unique identifiers to human-readable descriptions can be performed by a debugging library because the context information, stored in identifier blocks 310, is stored in the format and in the location of a call frame. Back trace tools will view the identifier block 310 no differently than any other call frame. In an embodiment, translation of the unique identifiers can be performed by the developer who retrieves the reference data from the context trace component 220 and correlates the unique identifier codes stored in the identifier block 310 with the function of the process 202 that was executing at the time of the failure. In this manner, a developer is equipped with adequate information to analyze the state of the process 202 at and near the time of failure to support debugging efforts.

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, various systems can be distributed across multiple computing systems, or combined into a single computing system. Further, various components of the illustrated systems can be implemented in one or more virtual machines, rather than in dedicated computer hardware systems. Likewise, the data repositories shown can represent physical or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multithreaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope

What is claimed is:

1. A method for managing a computer processing environment, comprising:
    generating an identifier for each function of a process, where each function of the process can create a task to be executed by one of a plurality of threads;
    executing the process in the computer processing environment;
    identifying an asynchronous task to be executed, the identified asynchronous task being created by a function that is executing tasks in a first thread;
    creating a task object associated with the identified asynchronous task;
    storing, in the task object, context information associated with the identified asynchronous task in the first thread;
    retrieving, from a call stack of the first thread, context information associated with a task currently executing in the first thread;
    storing, in the task object, the retrieved context information associated with the task currently executing in the first thread;
    placing, in a task queue, the identified asynchronous task and the task object;
    loading, in the call stack of a second thread, execution information associated with the identified asynchronous task;
    loading, in an identifier block in the call stack of the second thread, the context information stored in the task object, wherein the stored context information includes the context information of the identified asynchronous task and the context information of the task currently executing in the first thread; and
    executing the identified asynchronous task in the second thread.

2. The method of claim 1, wherein the retrieved context information includes information associated with one or more previously executed tasks that executed in the first thread.

3. The method of claim 1, wherein the stored context information associated with the identified asynchronous task includes a generated identifier for the function that created the identified asynchronous task, and the stored context information associated with the task currently executing in the first thread includes a generated identifier for a function that created the currently executing task.

4. The method of claim 1, wherein the retrieved context information associated with the task currently executing in the first thread is retrieved from an identifier block, associated with the currently executing task, in the call stack of the first thread.

5. The method of claim 4 wherein the identifier block associated with the task currently executing in the first thread includes context information associated with a task that has previously executed in the first thread.

6. The method of claim 5, wherein the context information associated with the task that has previously executed in the first thread includes context information associated with a task that immediately preceded the currently executing task in the first thread.

7. The method of claim 1 further comprising:
identifying when the identifier block has reached a maximum capacity; and
deleting context information from the identifier block on a first-in, first-out basis.

8. The method of claim 1 further comprising:
retrieving the context information stored in the identifier block of the call stack of the second thread when the identified asynchronous task fails to execute properly;
retrieving reference information that is associated with the generated identifiers for each function of the process; and
correlating the retrieved context information with the retrieved reference information.

9. A tangible, non-transitory, computer-readable storage medium having stored thereon executable instructions that direct a computing device to perform a computer processing environment management process that comprises the following executable components:
an identification component configured to generate an identifier for each function of a process, where each function of the process can create a task to be executed by one of a plurality of thread execution components;
a task identifier component configured to identify a task to be executed by a thread execution component;
a task object component configured to create a task object associated with the identified task;
a context capture component configured to retrieve context information associated with the identified task, associated with a currently executing task, and associated with a previously executed task, wherein the context information is retrieved from a thread where the identified task was generated;
a context storage component configured to store the retrieved context information in the task object;
a task sequencing component configured to place the identified task and the task object in a task queue to be executed by an available thread execution component;
a task loading component configured to load, into a call stack of the available thread execution component, execution information associated with the identified task;
an identifier block loading component configured to load an identifier block into the call stack of the available thread execution component, the identifier block including the stored context information, including the context information associated with the identified task, the currently executing task, and the previously executed task, from the task object; and
a task execution component configured to cause the available thread execution component to execute the identified task.

10. The tangible, non-transitory, computer-readable storage medium of claim 9, wherein the context information includes an identifier for the identified task, for the currently executing task, and for the previously executed task.

11. The tangible, non-transitory, computer-readable storage medium of claim 9, wherein the context information includes values of local variables or values of parameters used by the identified task, the currently executing task, or the previously executed task.

12. The tangible, non-transitory, computer-readable storage medium of claim 9, further comprising:
a back trace component configured to retrieve the context information stored in the identifier block in the call stack of the available thread execution component;
a reference component configured to retrieve a plurality of reference data that correlates each generated identifier with its corresponding function; and
an association component configured to display the correlated generated identifiers with their respective functions to provide context information associated with the identified task.

\* \* \* \* \*